United States Patent [19]

Petersson et al.

[11] Patent Number: 4,489,046
[45] Date of Patent: Dec. 18, 1984

[54] METHOD FOR WORKING-UP ARSENIC-CONTAINING WASTE

[75] Inventors: Stig A. Petersson, Skelleftehamn; Bengt S. Eriksson, Sundsvall, both of Sweden

[73] Assignee: Boliden Aktiebolag, Stockholm, Sweden

[21] Appl. No.: 608,269

[22] PCT Filed: Mar. 4, 1981

[86] PCT No.: PCT/SE81/00061
§ 371 Date: Oct. 1, 1981
§ 102(e) Date: Oct. 1, 1981

[87] PCT Pub. No.: WO81/02568
PCT Pub. Date: Sep. 17, 1981

Related U.S. Application Data

[63] Continuation of Ser. No. 546,646, Oct. 31, 1983, abandoned, which is a continuation of Ser. No. 308,544, Oct. 1, 1981, abandoned.

[30] Foreign Application Priority Data

Mar. 10, 1980 [SE] Sweden .................. 8001847

[51] Int. Cl.³ .............................................. C01G 28/00
[52] U.S. Cl. ......................................... 423/88; 75/6; 75/8; 75/21; 75/23
[58] Field of Search ............................ 75/6, 8, 21, 23; 423/87, 88, 617

[56] References Cited

U.S. PATENT DOCUMENTS

| 527,312 | 10/1894 | Austin | 423/87 |
|---|---|---|---|
| 894,764 | 7/1908 | Wedge . | |
| 900,467 | 10/1908 | Baggaley . | |
| 943,752 | 12/1909 | Livingston . | |
| 1,713,127 | 5/1929 | Hills | 423/88 |
| 1,782,418 | 11/1930 | Garred . | |
| 2,295,219 | 9/1942 | Kalling et al. . | |
| 2,650,159 | 8/1953 | Tan et al. | 75/6 |
| 3,380,819 | 4/1968 | Cavanaugh | 423/88 |

FOREIGN PATENT DOCUMENTS

| 73566 | 2/1932 | Sweden . | |
|---|---|---|---|
| 86798 | 7/1936 | Sweden | 423/87 |
| 9076 | of 1896 | United Kingdom | 423/88 |

OTHER PUBLICATIONS

Ullmans Encyklopadie der Technischen Chemie, vol. 2, Published 1974, Verlag Chemie, Weinheim/Bergstr., p. 53.

Primary Examiner—Herbert T. Carter
Attorney, Agent, or Firm—Stevens, Davis, Miller & Mosher

[57] ABSTRACT

A method is disclosed for converting an arsenic-containing waste product to a depositable, substantially arsenic-free form by fuming-off the arsenic content thereof. The method comprises melting the waste product under oxidizing conditions in a furnace to form an oxidic slag melt; causing turbulence of the melt, while maintaining a reducing atmosphere supporting the formation of arsenic (III) oxide at the furnace temperature driving-off arsenic content of the waste product substantially in the form of gaseous arsenic (III) oxide; separating the formed oxide by condensation and recovering the same and removing from said furnace a substantially arsenic-free depositable slag.

6 Claims, 1 Drawing Figure

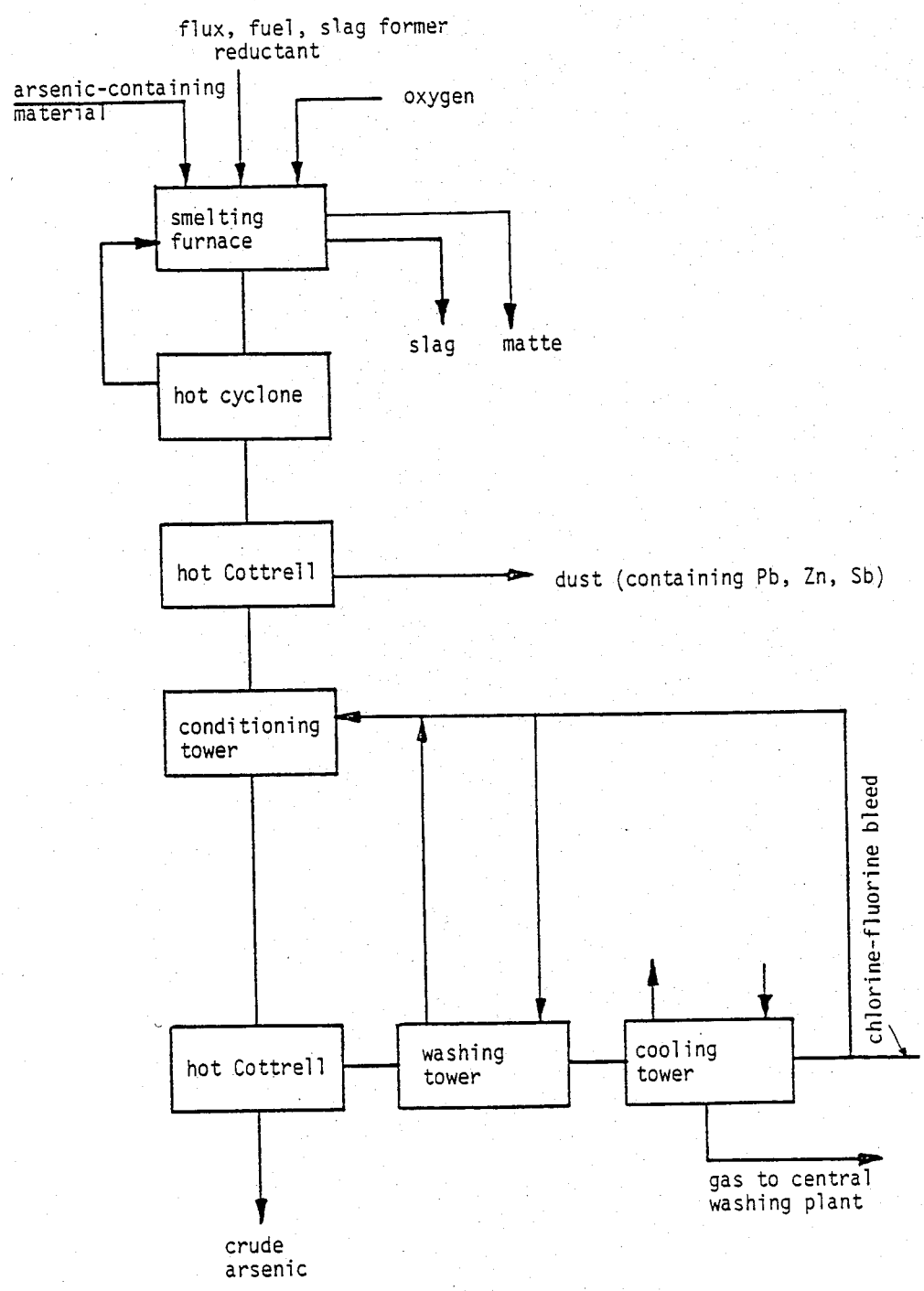

METHOD FOR WORKING-UP ARSENIC-CONTAINING WASTE

This application is a continuation of application Ser. No. 546,646, filed Oct. 31, 1983 which in turn is a continuation of application Ser. No. 308,544, filed Oct. 1, 1981, both now abandoned.

The present invention relates to a method of converting arsenic-containing waste products, to a depositable, substantially arsenic-free form, optionally while, at the same time, recovering arsenic and, possibly, also other metal values. The method particularly pertains to the working-up of arsenic-containing waste products originating from metallurgical or chemical processes, while recovering the arsenic content of the material and converting the material to a depositable form. By "depositable" is meant here and in the following a state in which the material can be deposited or dumped without detriment to the environment. By arsenic-containing waste products is meant all arsenic-containing material and products, such as slag, dross, dust and sludge products originating from metallurgical, chemical and pharmaceutical processes, and which products because of their physical and chemical character are not suitable as raw material for the conventional production of arsenic and arsenic products.

Considerable quantities of waste products are often produced within the metallurgical and chemical industries, partly as a result of the various activities within these industries and partly as a result of those steps which said industries are obliged to take in order to limit the emission of contaminating substances. Such waste products include sludge from metallurgical processes, such as wet-process waste sludge from hydrometallurgical zinc-producing processes, and waste sludge from the gas purification systems of sulphuric-acid plants. The waste products may also be dust of mutually different composition and origin, such as dust obtained when roasting copper concentrates and pyrite concentrates, or when converting matte; or dust obtained when producing lead pyrometallurgically. These dusts, which are produced in extremely large quantities in said context, normally accompany the process gases and are separated in special filters, which may be of an electrical or mechanical type. The arsenic content of such waste products is often up to 20–40%, rendering it difficult to safely dump said waste products because of the enormous environmental problems created thereby, even though the prescribed safeguards per se have been taken. The arsenic content, however, is normally so low that if it is to be recovered industrially, the waste products must be subjected to some form of further treatment. A major part of the development work in this field has been done by applicant, i.e. Boliden AB, which is an industry of the aforementioned kind, and is active in a country in which extremely advanced legislation concerning the deposition of poisonous wastes has long been in force. Many proposals have been made for converting waste products of the aforementioned kind to a form in which they can be safely dumped, and many attempts have been made to convert said waste products to said safely dumpable form, although hitherto in no case has it been possible to obtain a sufficiently low arsenic content, without diluting or thinning the material in some way. In addition, the resultant end product is always liable to weather, and disintegrate to form dust. Such is the case, for example, when arsenic-containing waste products are treated thermally with a reductant in a rotary furnace at temperatures up to 500° C. When thus treated, the material is constantly in solid phase and is thus not melted, and the lowest content of arsenic which can be achieved when using solid reactants, which are substantially the only reductants, active in the present context, is about 2%, which is far greater than the permitted arsenic content of material which is to be deposited. Furthermore, the treatment times involved in such methods are unreasonably long, which renders them economically unviable. Attempts have also been made to carry out the aforementioned method at temperatures higher than 500° C. This has created problems, such as the sintering of the material being treated, however, causing the fuming-off of arsenic to practically cease. For example, when treating one ton of arsenic sludge containing about 20% arsenic and originating from a leaching plant, at 550° C. with one hundred kg of coke, it was not possible to lower the arsenic content to a level beneath 4.2% As. When treating the sludge in two stages, comprising a first stage without the reductant and a second stage with coke, there was obtained a final product containing 30% As, which content excludes the possibility of depositing the material without danger to the environment.

In order to solve the problem of a final product which is liable to weather and form dust, methods have been proposed in which the waste products are, instead, smelted and reduced together with a slag former while optionally introducing an inert or reducing gas thereinto. Thus, arsenic sludge originating from a sulphuric-acid plant has been treated by smelting and reduction together with slag formers in a rotary furnace, thereby to obtain a slag-like, non-dusting product. One serious, and generally recognized disadvantage with treating material by, for example, reduction in molten state as compared with a corresponding treatment in solid state is, however, the normally occurring, significant lowering of the activity of the chemical substances and compounds present in the material. With regard to the reduction of a substance or a chemical compound present, for example, in a slag melt, both the equilibrium content which is possible to achieve in the final stage of the treatment and the rate at which the reduction takes place are dependent upon the activity of the substance or the chemical compound in the slag melt. Thus, there is achieved by the smelt process in the rotary furnace a very slow process and an excessively high arsenic content in the final product, even though the problem concerning a weathering and dust-producing end product might be solved in this way.

The object of the present invention is to eliminate the aforementioned disadvantages in the destruction of arsenic-containing waste products, to form a depositable product. Thus, the invention includes a method which enables the arsenic content of arsenic-containing waste products mentioned in the introduction in a form such that arsenic products, such as arsenic metal or arsenic oxide, can be produced commercially from said waste products, while converting said waste products to a state in which they can be utilized, e.g. for building purposes, or can be deposited without detriment to the environment. If the waste products also contain metal values, said products should, of course, be treated to recover said metals prior to being deposited.

Thus, in the method according to the present invention there are treated suitable arsenic-containing waste products, which may be of extremely different kinds and obtained from both chemical and metallurgical processes, for removing and recovering the arsenic content, while imparting to the final product such physical and chemical properties as to render said product depositable. Thus, the invention is characterized by smelting the waste product, optionally in the presence of a slag former, to form a slag melt and optionally a sulphide melt in a furnace; by maintaining in said furnace, with the melt in turbulence, by strong agitation an atmosphere having a partial pressure of oxygen is created by blowing a gas having said partial pressure of oxygen through at least one nozzle arranged in the furnace wall beneath the upper surface of the slag melt such that arsenic(III)oxide is formed at prevailing temperatures, whereat the arsenic content of the waste product is substantially driven off as a gaseous arsenic(III)oxide, which is separated by condensation and recovered; and by removing a substantially arsenic-free, depositable slag from said furance. Particularly advantageous embodiments of the invention are disclosed in the following claims 2-6.

Although the choice of slag melt is not considered to be directly critical, the melt primarily shall include a non-metallic phase in molten state, preferably oxidic and of silicate or aluminate type having a low melting point. When the waste product contains iron compounds, a fayalite slag melt, i.e. iron oxide silicate in molten form, is particularly preferred.

The partial pressure of oxygen at which it is suitable to carry out the process in the present context is limited towards the higher level of partial pressure by the equilibrium between arsenic (III)oxide and arsenic(V)oxide, and towards the lower level of said partial pressure by the equilibrium between metallic arsenic and arsenic(III)oxide. One of normal skill in this art should be able to calculate the limits for the partial pressure of oxygen at the selected operation temperatures, with the aid of available thermodynamic basic data.

The devices and apparatus described in the description and set forth in the claims for carrying out the method according to the invention are in no way critical, and neither should they be considered the only apparatus and devices which can be used, but rather seen as examples of such apparatus and devices with which the method can be advantageously carried out. As will be understood, there are a wide number of furnaces and types of furnace with which the furnace atmosphere can be controlled or regulated and the slag melt well agitated. For example, a number of furnace types used today within the iron and steel industry, such as Uddacon converters, AOD converters, CLU converters etc. can, with all probability, also be used.

A preferred, particularly advantageous embodiment of the invention will now be described in more detail with reference to the drawing.

The invention will also be illustrated by means of four working examples.

The drawing illustrates a preferred flow diagram for the destruction of arsenic-containing products in accordance with the invention. As will be seen from the drawing, the arsenic-containing waste product is charged, preferably substantially continuously together with a slag former and, if so desired, also a flux, to a rotary converter of the Kaldo type, in which said product, slag former and, when added, said flux are heated to form a melt having a temperature of between 1300° and 1400° C. The heat required is supplied with the aid of an oil/oxygen burner directed onto the formed melt, and the oil:oxygen ratio of said burner is adjusted so that the oxygen potential in the furnace space enables a volatile arsenic compound to be formed. Solid particles which accompany the departing gas are separated from said gas in a subsequent high-temperature cyclone, whereafter metals, such as lead, and zinc and antimony, volatilized from the waste product, are separated from said product in a hot electrical precipitator, sometimes referred to as a hot Cottrell precipitator, at a temperature of about 300° C. Subsequent to leaving the hot-electrical precipitator the gas is treated in a conditioning tower, and arsenic, in the form of arsenic(III)oxide (crude arsenic) is separated out and recovered in a subsequent electrical precipitator at a temperature of about 150° C. Any arsenic remaining in the gas is recovered together with halogens by washing with subsequent cooling, whereat the washing water and condensate separated in the cooling tower are returned to the conditioning tower subsequent to optionally bleeding off a part of said water and condensate, as indicated in the FIGURE with "chlorine-fluorine bleed". A gas-purification system of the kind illustrated here is described in its entirety in our patent SE 7306101-2. A depositable slag having a low arsenic content is then removed from the rotary converter, and when also containing zinc originating from a zinc-containing waste product can also be treated in a fuming furnace for recovering the zinc content prior to being deposited or utilized for other purposes. If the waste product also contains copper and precious metals, these can readily be covered by washing the slag melt with iron sulphide subsequent to driving off the arsenic, thereby to obtain a matte phase, which effectively dissolves and absorbs said metals. The matte phase can then be separated in liquid state from the slag phase relatively simply, for further benification in a copper smelter.

In the aforegoing and in the following examples and claims, all contents expressed in percent relate to percent by weight.

EXAMPLE 1

A waste product comprising sludge containing about 20% arsenic and obtained from a gas-purification system connected to a plant for roasting arsenic-containing concentrates was continuously charged to a top-blown rotary converter to the Kaldo type, together with slag former and flux in a weight ratio of 10:1:1, to a total quantity of 3600 kg while progressively smelting said material at a temperature of 1310° C. The charge was smelted with the aid of an oil/oxygen burner, and during the smelting process the burner was set to 3:5 (1 oil/min:Nm$^3$ oxygen/min). The charge was interrupted after 30 minutes. By setting the oil/oxygen flow to 2:1, whereby a more reducing atmosphere could be maintained, and by rotating the converter at a speed of about 20 r.p.m., it was possible to reduce the arsenic content in the melt to 0.71% in 120 minutes.

The run was stopped here, since the main object was to bring the arsenic content down to beneath 1%. It was found, however, that the driving-off process was substantially a linear function of time even at the final content, and hence an arsenic content of less than 0.1% would be obtained if the treatment time was extended by solely about 5 minutes. The residual slag melt was tapped off and caused to solidify prior to being deposited. The arsenic driven off was precipitated in the form of an oxidic dust in a Cottrell connected to the exhaust duct.

EXAMPLE 2

50 kg of arsenic-containing sludge from a sulphuric-acid plant and 10 kg of $SiO_2$ as slag former were charged to a bricked-in high-frequency furnace carrying a 100 kg charge weight and provided with a bottom nozzle. When the entire charge had melted, the arsenic content was 15.8% and the temperature of the smelt was 1350° C. 300 $Nm^3$ CO/h were then blown through the nozzle for 24 minutes. Subsequent hereto the smelt was found to contain 0.1% As. The molten slag was then permitted to solidify, there being obtained a glassy solid product with low arsenic content.

EXAMPLE 3

1700 kg of sludge obtained in a copper smelter and containing 20.4% As, and 300 kg of fayalite slag were charged to a rotary converter of the Kaldo type provided with an oil burner and having a charge weight of about 2 tons. When the entire charge had melted the temperature of the smelt was 1375° C. and the burner setting was adjusted from 2.5 liters of oil/min:5.5 $Nm^3O_2$/min to 2 liters of oil/min:1.5 $Nm^3O_2$/min. The speed at which the furnace was rotated during the whole of the test was 20 rpm. After 90 minutes the slag was analyzed and tapped off and permitted to solidify to a glassy product, having an arsenic content of 0.2%. The arsenic driven off was precipitated in dust form, so-called crude arsenic, in a Cottrell. The arsenic content of the dust was found to be 94.4% $As_2O_3$, thereby enabling the dust to be readily handled for further working up to a commercial arsenic-oxide quality in an available conventional arsenic refining system.

EXAMPLE 4

50 kg of cobalt-arsenic concentrate of the following composition were charged to a high frequency furnace of the kind described in example 2:
- As: 64.5%
- Co: 14.0%
- Fe: 5.2%
- Ni: 3.5%
- Cu: 0.27%
- S: 1.9%
- Mo: 0.14%
- Ag: 20 g/t The concentrate was melted at a temperature of 1200° C. under oxidizing conditions, by permitting the atmosphere to have free access to the furnace. Subsequent to melting the concentrate, a reducing gas in the form of a gaseous mixture comprising 50% CO and 50% $N_2$ was blown into the furnace for 30 minutes in an amount corresponding to 300 $Nm^3$/h. The purpose of the run at this stage was to reduce the arsenates in the slag to volatile arsenic trioxide, for separating the arsenic and cobalt. For this reason, 5 kg of pyrite were also added to the melt after the carbon monoxide treatment, in order to wash the cobalt content from the melt while forming a matte phase. In this way there was obtained a slag containing 4.5% As and a matte phase comprising substantially all the cobalt.

By means of this treatment process it was possible to reduce the arsenic content of the material by 93% while practically all the cobalt was absorbed in the matte phase, which was tapped off. The residual slag phase containing 4.5% As was re-treated with a gaseous mixture according to the above for about 3 minutes, whereat the arsenic content of the slag was reduced to 0.15%.

We claim:

1. A method of converting an arsenic-containing waste product to a depositable, substantially arsenic-free form by fuming-off the arsenic content thereof, comprising melting the waste product under oxidizing conditions in a furnace to form an oxidic slag melt; causing turbulence of the melt, while maintaining a reducing atmosphere supporting the formation of arsenic(III)oxide at the furnace temperature; driving-off arsenic content of the waste product substantially in the form of gaseous arsenic(III)oxide; separating the formed oxide by condensation and recovering the same and removing from said furnace a substantially arsenic-free depositable slag.

2. The method according to claim 1, wherein an atmosphere with partial pressure of oxygen is created by blowing a gas having said partial pressure of oxygen through at least one nozzle arranged in the furnace wall beneath the upper surface of the slag melt.

3. The method according to claim 1, wherein turbulence of the melt is effected by strongly agitating the same.

4. The method according to claim 3, wherein said agitation is effected mechanically or inductively.

5. The method according to claim 4, wherein an atmosphere with partial pressure of oxygen is created by means of an oil burner directed downwardly onto the slag melt.

6. A method of treating an arsenic-containing metal sulfide concentrate to recover arsenic and any nonferrous metal and to form a depositable, substantially arsenic-free, slag by fuming-off the arsenic content thereof, comprising smelting the concentrate under oxidizing conditions to form a sulfide melt containing the non-ferrous metals and an oxidic slag melt, causing turbulence of the melt and supplying a reducing gas so as to reduce any arsenates in the slag to volatile arsenic trioxide, separating the sulfide melt and the slag melt, maintaining the residual slag melt in a reducing atmosphere under turbulence of the melt, driving-off arsenic content of the slag substantially in the form of gaseous arsenic(III)oxide; separating the formed oxide by condensation and recovering the same and removing from said furnace a substantially arsenic-free depositable slag.

* * * * *